Sept. 2, 1958          L. HUDSON          2,850,692

AUTOMATIC PILOT INCLUDING ELECTRIC SERVO MEANS

Filed Dec. 12, 1955          2 Sheets-Sheet 1

Fig. 1A

INVENTOR.
LINCOLN HUDSON
BY
ATTORNEY

Sept. 2, 1958         L. HUDSON         2,850,692

AUTOMATIC PILOT INCLUDING ELECTRIC SERVO MEANS

Filed Dec. 12, 1955         2 Sheets-Sheet 2

Fig. 1B

INVENTOR.
LINCOLN HUDSON
BY Gordon Reed
ATTORNEY

United States Patent Office 2,850,692
Patented Sept. 2, 1958

2,850,692

AUTOMATIC PILOT INCLUDING ELECTRIC SERVO MEANS

Lincoln Hudson, Brooklyn Center, Minn., assignor to Minneapolis-Honeywell Regulator Company, Minneapolis, Minn., a corporation of Delaware Application December 12, 1955, Serial No. 552,334

21 Claims. (Cl. 318—489)

The present invention relates to apparatus for automatic control of a condition and more particularly to apparatus for smooth automatic control of the attitude of an aircraft.

An object of the present invention is to provide automatic control apparatus for stabilizing the attitude of the craft and in providing in such apparatus a novel form of synchronizing regulation so as to avoid abrupt deflections of the attitude control member of the craft when initiating control from such apparatus.

A further object of this invention is in providing novel synchronizing means for synchronizing flight control apparatus to an existing attitude of an aircraft prior to the application of automatic control from the apparatus to the craft.

A further object of the present invention is to provide in flight control apparatus for an aircraft an arrangement whereby control of the aircraft apparatus may be shifted from an attitude stabilizing device to a manual controller and wherein time delay means are provided during return of said apparatus to automatic control.

A further object of this invention is to provide in the flight control apparatus an arrangement whereby the same technique used in directly controlling the craft from the conventional manual pilot means is utilized in controlling the craft manually through the apparatus.

A further object of the invention is to provide novel automatic pilot apparatus for an aircraft wherein the automatic pilot can be synchronized to the attitude of the craft and thereafter engaged by the operation of a control switch and wherein after such engagement the apparatus can be used to stabilize the aircraft in a given attitude and wherein it may be operated to cause the craft to perform coordinated banked turns from the conventional manual control column of the craft.

A further object of this invention is to utilize an auxiliary servo mechanism having a variable speed motor and wherein the mechanism may be utilized as a heading error repeater to couple the aircraft heading error detector to the apparatus to provide a heading stabilizing signal in the apparatus and wherein the servo mechanism may be coupled to the craft roll attitude sensor to be utilized as a bank synchronizer during manual control of craft heading through the apparatus with the mechanism having novel adjustable velocity means for controlling and damping the speed of the motor.

A further feature of the invention is in providing the auxiliary servo mechanism with a novel velocity feedback control to prevent over shoot of the mechanism and also to provide a novel signal limiting arrangement for limiting the magnitude of the bank angle provided by the heading error detector.

The above and other objects and advantages of the invention will more readily appear hereinafter from a consideration of the detailed description which follows taken together with the subjoined drawings wherein one embodiment of the invention is illustrated by way of example.

In the drawings, Figures 1A and 1B together constitute a diagrammatic illustration of an automatic pilot apparatus for an aircraft embodying the present invention.

Figure 1A:
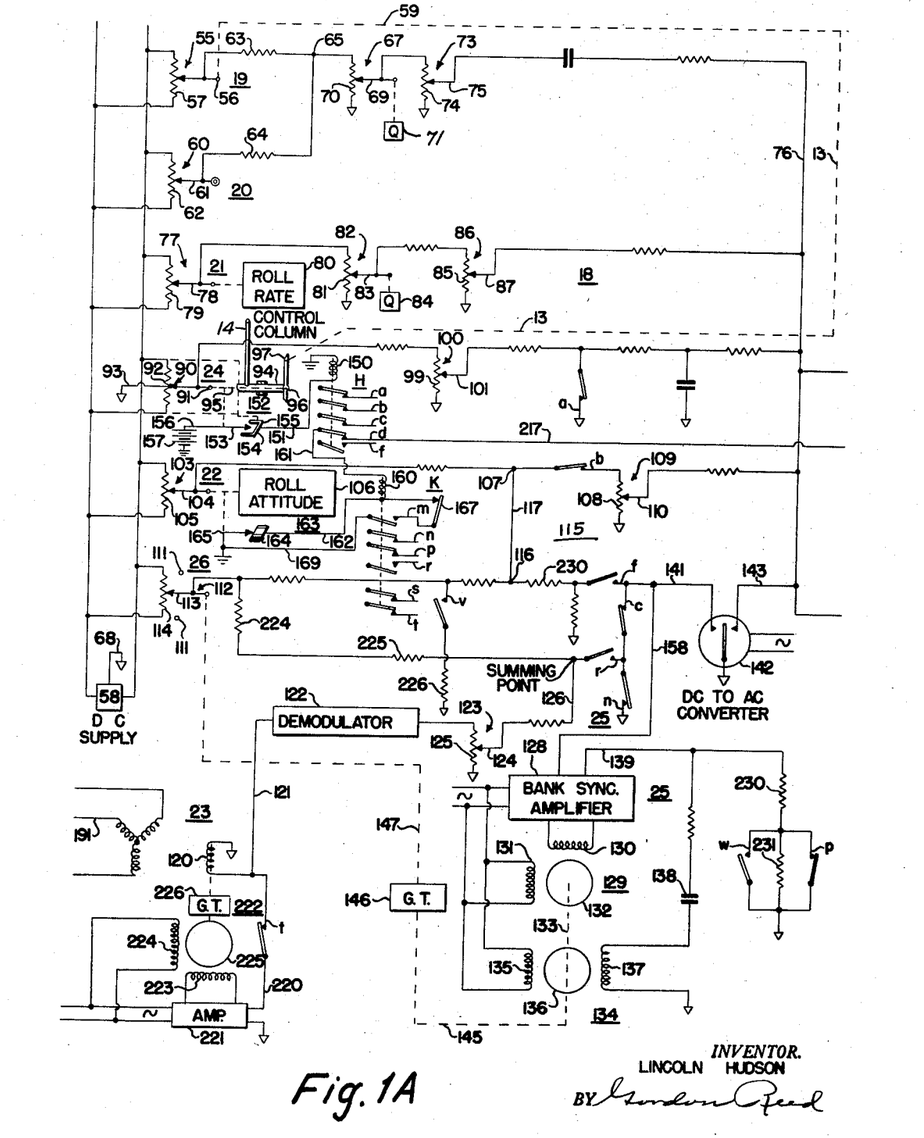
Figure 1B:
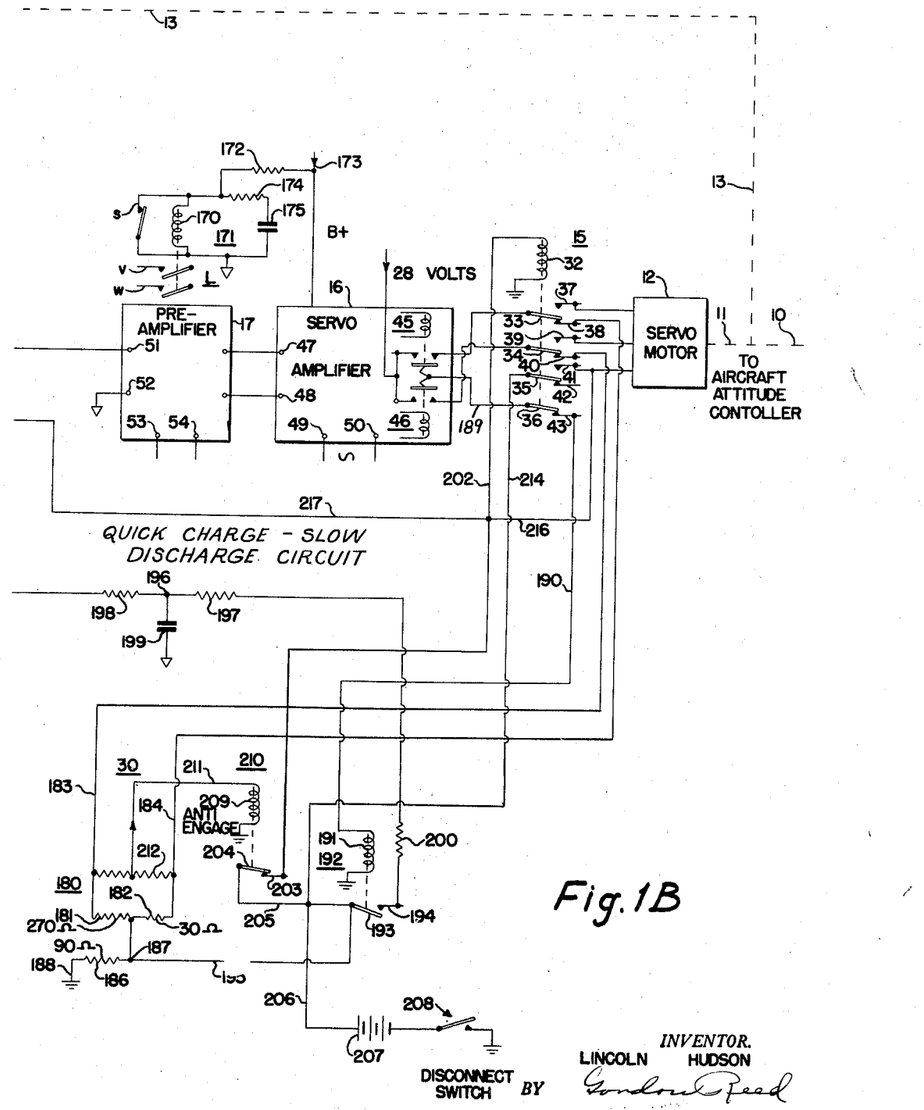

Referring to the two figures, an operating member 10 Figure 1B is adapted to position roll attitude control devices (such as ailerons not shown) of an aircraft. The member 10 may be operatively driven by an output element 11 of a servo motor 12. Alternatively, the member 10 may be positioned through an operating connection 13 extending from a conventional control column 14 Figure 1A of an aircraft.

The servomotor 12 is reversibly controlled through an energized servomotor engage relay 15 by a servo amplifier 16. The amplifier 16 in turn is operated through an intermediate preamplifier 17 from a balanceable voltage network 18.

The network 18 is of the rebalancing or follow-up type and beginning from upper left Figure 1A includes a servomotor follow-up signal generator 19, a trim signal generator 20, a roll rate signal generator 21, and a roll attitude signal generator 22. By means of the above signals in network 18, the roll attitude of the aircraft may be stabilized.

The network 18 is additionally utilized during heading stabilization, and for this purpose additionally includes a heading error signal generator 23 for effecting operation of the bank control devices. It is to be understood that while the invention primarily involves the bank control device of the aircraft that there is contemplated the accompanying operation of the yaw control devices, such as the rudder surface of the aircraft, during heading stabilizing control of the craft and manual selected changes in craft heading. Manual selected changes in heading may be effected through the operation of a control stick steering signal generator 24 operative from the control column 14. Since operation of the signal generator 24 is to approximate substantially the same techniques utilized during manual operation of the control devices, the heading stabilizing signal generator 23 is effectively nulled during operation of the signal generator 24 so that it does not oppose a change in heading. Additionally, the bank attitude signal generator 22 is rendered ineffective to control the network 18. While it is thus rendered ineffective, the signal therefrom is applied to a bank attitude synchronizer 25 which operates a bank attitude synchronizer generator 26 in network 18 for opposing the signal from generator 22. Consequently when the control column 14 is moved to unoperative condition and the signal generators 22 and 26 are reconnected with network 18 the roll attitude stabilizing signal generator 22 will not attempt to remove the bank attitude manually set in from the control column 14. Consequently, the bank attitude is achieved in the same manner or by the same techniques by operation of the signal generator 24 as would be obtained from the direct operation by the control column 14 of the operating member 10 that positions the attitude control devices of the craft.

During the direct manual operation of member 10 from the control column 14 which may cause change in bank attitude of the craft, the network 18 is conditioned for automatic control through the operation of a pre-engage trim arrangement 30 Figure 1B. The trim arrangement 30 is controlled through the unenergized engage relay 15 from the servomotor amplifier 16. The arrangement 30 substantially conditions the autopilot to the existing attitude of the aircraft or rate of change of aircraft attitude so that automatic control involving operation of servomotor 12 may be applied without causing a sudden operation of the member 10 upon application of automatic or autopilot control.

A detailed description of the components and their interrelation in the invention follows. The servomotor 12 may comprise a motor, clutch, brake combination old in the art wherein the motor comprises a pair of field windings which may be alternatively energized along with an armature winding and clutch winding and wherein the energization of the clutch winding causes the removal of a braking action on the motor. Alternatively, the servomotor 12 may be similar to that disclosed in Patent No. 2,425,733 to Willis H. Gille et al., comprising a constantly energized motor driving through a mechanical differential and controlled by brake and clutch windings. The engage relay 15 comprises an operating winding 32 and four operable arms 33, 34, 35 and 36. Arm 33 coacts with "in" contact 37 and "out" contact 38; arm 34 coacts with "in" contact 39 and "out" contact 40; arm 35 coacts with "in" contact 41 and "out" contact 42; and arm 36 coacts with "out" contact 43. The "in" contacts 37 and 39 are connected to the remote ends of the servomotor field windings as in the Lear patent or may be connected to the servomotor clutch windings of the Gille patent. The "in" contact 41 may be connected to a magnetic clutch for coupling the output of the servomotor 12 to the output element 11 or may be connected to the brake windings of the servomotor in the Gille patent.

The servomotor amplifier 16 is of the A. C. discriminator type disclosed in the Gille patent. This amplifier includes a pair of alternatively operable relays 45, 46 along with A. C. signal voltage input terminals 47, 48 and A. C. power supply terminals 49, 50. One or the other of the relays is operated depending upon the phase relationship of the signal voltage across terminals 47, 48 relative to the voltage across power supply terminals 49, 50. The amplifier 16 thus is of the A. C. discriminator type having a pair of alternatively operable relays. Each relay like the relays of the amplifier in the Gille patent operate continuously or intermittently depending upon the magnitude of the control signal supplied across terminals 47, 48. The preamplifier 17 is a conventional A. C. signal voltage amplifier and comprises input terminals 51, 52 supplied with A. C. signals to be amplified and D. C. power input terminals 53, 54. The output of the A. C. voltage amplifier 17 is supplied to the servoamplifier terminals 47, 48.

The balanceable network 18 is of the D. C.-parallel summing type which sums a plurality of D. C. signals and converts the sum into an A. C. signal to supply to the preamplifier 17. Network 18 includes as stated a servomotor followup or aileron followup signal generator comprising a potentiometer 55 comprising a slider 56 and a 2000 ohm resistor 57 which is connected across a D. C. supply 58. The slider 56 may be operated along resistor 55 through an operating means or follow-up drive 13, 59 extending from the servo output element 11. Signal generator 20 comprises an aileron trim potentiometer 60 comprising a manually positioned slider 61 and a 10,000 ohm potentiometer resistor 62 connected to the D. C. supply source 58. Concerning the two potentiometer sliders, slider 56 is connected through a 2000 ohm resistor 63 to a summing point 65 and slider 61 in turn is connected through a 51,000 ohm resistor to the same summing point 65. Connected between the summing point 65 and the signal ground ($\triangledown$) of network 18 is a 4000 ohm resistor 70 of a voltage dividing potentiometer 67 having an operable slider 69. Slider 69 is operated along resistor 70 by means of a differential air pressure or "Q" sensing device 71 positioned according to the difference of impact and static air pressures on the craft. Connected between slider 69 and signal ground is a resistor 74 of a voltage dividing potentiometer 73 having an adjustable tap 75. The slider 75 is connected to a main summing conductor 76 through series connected elements comprising a 25 microfarad capacitor and a 220,000 ohm resistor.

Roll rate signal generator comprises a potentiometer 77 having an operable slider 78 and a 1400 ohm potentiometer resistor 79 connected across the D. C. supply source 58. Slider 78 is operated along resistor 79 by a roll rate responsive device 80. The roll rate responsive device 80 may be a conventional rate gyroscope with the displacement of slider 78 from its normal position on resistor 79 being proportional to the craft roll rate. A 5000 ohm resistor 81 of a voltage dividing potentiometer 82 is connected between slider 78 and signal ground. Potentiometer 82 includes an operable slider 83 which is positioned along resistor 81 by means of a "Q" sensor 84. The Q sensor 84 also operates in accordance with the difference of the impact and the static air pressure on the aircraft and is similar to the device 71. Slider 83 is connected through a 5100 ohm resistor to one end of a 10,000 ohm resistor 58 of a voltage divider having its opposite end connected to signal ground. Resistor 85 constitutes one part of a roll rate adjustment potentiometer 86 having an adjustable slider 87. Slider 87 is connected through a 1 megohm resistor to the summing conductor 76.

Manual control signals from signal generator 24 for signal network 18 are derived from a control stick steering potentiometer 90 having a manually adjustable slider 91 and a 1250 ohm resistor 92 connected across the supply 58. Resistor 92 includes a center tap connection 93 extending to signal ground common to ground 68 of supply 58. Slider 91 is displaced relative to the resistor center tap in proportion to the force supplied to the control stick 14. To this end, the resistor 92 is secured to a hollow cylindrical outer member 94 fastened at one end to a hub member 96 whereas the slider 91 is secured to an inner spindle 95 also secured to one end to the hub 96. The control column 14 is secured to the member 94 a sufficient longitudinal distance from the fastening of member 94 to hub member 96 so that if the hub 96 be held fixed or meets a resistance to its rotation the slider 91 will be displaced relative to the center tap of resistor 92. A radially extending arm 97 fastened to hub 96 is connected to the actuating means 13 extending from the member 10. It will be clear that with the servomotor 12 engaged with member 10, either through the energization of its magnetic clutch or the energization of its brake solenoids as in the Gille patent, that the arm 97 will incur a resistance to its displacement when force is applied to control column 14 whereby signals from potentiometer 90 are derived. This type of signal generator is analogous to that shown in U. S. Patent No. 2,604,613 which shows the control column 2 therein analogous to the control stick 14 of the present arrangement and other elements clearly corresponding to that referred to herein. Slider 91 is connected through a 1000 ohm resistor to one end of a 5000 ohm voltage dividing resistor 99 having its opposite end connected to signal ground. Resistor 99 comprises a part of a control stick steering adjustment voltage divider 100 having an adjustable slider 101 positioned along resistor 99. Extending in series relationship from slider 101 to conductor 76 are a 10,000 ohm resistor, a 200 kilo-ohm resistor, and a 1 megohm resistor. The junction of the 10,000 ohm and 200 kilo-ohm resistors is connected to signal ground through a normally closed contact of a relay H to be described. The junction of the 200K and the 1 megohm resistors is connected to signal ground through a 4 microfarad condensor.

Roll attitude signal generator 22 comprises a bank attitude potentiometer 103 having an adjustable slider 104 and a 1120 ohm resistor 105 connected across the D. C. supply 58. Slider 104 is positioned along resistor 105 from its normal position by a roll attitude device 106 which may be a conventional vertical gyroscope. The displacement of slider 104 along resistor 105 is in proportion to the bank attitude or roll attitude of the craft. Slider 104 is connected through a 10 kilo-ohm resistor to a terminal 107. Connected to terminal 107 through a normally closed contact b of the H relay is a 10,000 ohm resistor 108 having its opposite end connected to signal ground. The resistor 108 constitutes part of a voltage dividing potentiometer 109 having an adjustable tap 110. Adjustable tap 110 is connected through a 300 kilo-ohm resistor to the conductor 76.

Bank or roll attitude synchronizing signal generator 26 comprises a bank synchronizer potentiometer 112 having an operable slider 113 and a 1250 ohm resistor 114 which is connected across the D. C. supply 58. Potentiometer 112 is a network synchronizing or rebalancing signal generator and constitutes part of a servo mechanism to be described. Slider 113 has its displacement intercepted short of the ends of resistor 114 by stops 111 which limit the output of potentiometer 112 which is connected through a 2200 ohm and 8200 ohm resistor connected in series relation to a terminal 116. A conductor 117 connects terminal 116 to the aforementioned terminal 107.

Heading error or course error signals are derived from a signal generator 23 which may be of the synchro type comprising a three phase stator winding and a rotor or control transformer winding 120. The synchro 23 may be similar to the synchro 29 of Patent 2,659,554, Figure 1, for providing heading error signals. The heading error signals from signal generator 23 are not supplied directly to network 18 but rather are supplied thereto through a repeater servo mechanism 25. The rotor winding 120 which derives an A. C. signal proportional to heading error is connected through conductor 121 to an A. C. to D. C. demodulator 122. The output of the demodulator 122 is supplied to one end of a 10,000 ohm resistor 125 of a voltage dividing potentiometer 123. The opposite end of the resistor 125 is connected to signal ground. The voltage dividing potentiometer 123 includes an adjustable tap 124 which is connected through a 12 kilo-ohm resistor to a signal input conductor 126 of the bank synchronizer 25. Slider 113 of the bank synchronizer potentiometer 112 is also connected through a 10,000 ohm resistor 224 and 51 kilo-ohm resistor 225 in series to input conductor 126.

The bank synchronizer 25 includes a bank synchronizer amplifier 128. This amplifier 128 is of the A. C. discriminator type similar to that in the U. S. patent to Upton 2,423,534 or Murphy 2,659,554. The output of the amplifier 128 operatively controls an induction motor 129 having an amplifier energized winding 130 and a line winding 131. The direction of rotation of the motor 129 depends upon the phase relationship of the control signal supplied to the amplifier 128 relative to the voltage of the line winding. The motor 129 drives a velocity signal generator 134 comprising a primary winding 135 energized from the A. C. line, a motor driven rotor 136, and a secondary winding 137. The voltage generated in secondary winding 137 depends upon the speed of rotation of the rotor 136 which inductively couples winding 135 with winding 137 while rotating. One end of secondary winding 137 is connected to signal ground and its opposite end is connected through a capacitor 138 and an 820 ohm resistor to a second signal input conductor 139 of amplifier 128 and may be used to damp rotation of motor 129. Since the amplifier 128 must be supplied with A. C. control signals, the D. C. control signals derived from potentiometer 112 and the demodulator 122 are supplied to a D. C. to A. C. converter 142 by means of two series connected relay contacts r of a K relay and c of the H relay (to be described) extending from input conductor 126. These series connected contacts r and c extending from conductor 126 comprise an assumed closed but a normally open contact r of the relay K and a normally closed contact c of a relay H. This series connection preferably extends to a terminal 141. A conductor 158 connects terminal 141 and amplifier 128 to transmit A. C. signals thereto. Terminal 141 is connected to one side of the D. C. to A. C. converter 142. Thus the control signals on conductor 126 are converted from D. C. to A. C. signals. The D. C. to A. C. converter 142 also includes a second terminal 143 which is connected to the conductor 76 in network 18 for converting its D. C. voltage signals to a resultant A. C. voltage signal whereby A. C. signals are supplied to the preamplifier 17.

Thus during heading stabilizing of the craft when control column 14 is not operated, the synchronizer 25 acts as a repeater servo mechanism for the heading error signal derived in signal generator 23. The voltage from the potentiometer 112 balances the signal derived from signal generator 23 which during heading stabilizing is applied to a bank synchronizer amplifier 128. The slider 113 of potentiometer 112 is driven by the bank synchronizing motor 129 through an operating means 145 extending from motor shaft 133, a gear train 146, and an output shaft 147 extending from the gear train to slider 113. While the voltage from potentiometer 112 is supplied through the 10 kilo-ohm resistance 224 and 510 kilo-ohm resistance 225 in series to the input conductor 126 of bank synchronizer amplifier 128, it is also supplied in parallel through a 2200 ohm and 8200 ohm resistor to terminal 116 and thence through conductor 117 to terminal 107 where it is summed with the roll attitude signal from potentiometer 103. It will thus be apparent that upon heading stabilization from the signal generator 23, that the signal generator 23 through demodulator 122, and bank synchronizer potentiometer 26 commands a bank angle to the network 18 which causes the operation of the servomotor 16 to position the ailerons in a conventional follow-up system. The aileron positioning causes a craft to bank and change roll atttiude, the vertical gyroscope 106 through the potentiometer 103 supplies a signal of opposite polarity to that provided by the signal generator 26 causing the movement of the aileron surfaces toward the normal position.

While it would thus appear that the bank angle of the craft is made proportional to the heading error derived from the signal generator 23, yet in order to limit the magnitude of the bank angle for extremely large heading errors, potentiometer slider 113 abuts stops 111 to limit the signal from potentiometer 26. The bank command signal limited by stops 111 and derived from potentiometer 112 and which is supplied to terminal 116 is reduced through a voltage dividing or attenuation circuit. This circuit extends from the function of the 2200 and 8200 ohm resistors and through an in contact v of a relay L and through a 1.8 kilo-ohm resistor 226 to signal ground common to the signal ground 68 of the D. C. supply 58. While the operation of the aileron surfaces to bank the craft during heading deviations from a desired heading has been described, it is to be understood that the rudder surface of the aircraft is concomitantly operated. Arrangements for operating the rudder in response to operation of the aileron control surface displacement have been heretofore provided in the prior art. An example of such operation of the rudder in response to the aileron surface displacement is disclosed in an application of George W. Rusler Jr. Serial Number 409,711, filed February 11, 1954.

As evident thus far, the heading stabilizing signal for operating bank synchronizer amplifier 128, and supplied to the D. C. to A. C. converter 142, depends upon contacts of a relay K and a relay H whereas the supplying of the heading error signal from potentiometer 112 to servo control network 18 in a limited of reduced value depends upon the contact $v$ of a relay L.

The relay H shown in Figure 1a is of the five pole type having four normally closed or "out" contacts $a$, $b$, $c$ and $d$ and one normally open or "in" contact $f$. When the relay H is energized the normally closed contacts are opened and the normally opened contact is engaged. The H relay includes an operative winding 150 for the operable arms. One end of the relay is connected to ground and the opposite end thereof is connected through a conductor 151 to a control switch 152. The switch 152 comprises a pair of slightly spaced contacts 154, 155 secured to member 94 and illustrated with exaggerated spacing both of which are connected to conductor 151 and an operable arm 153 which is normally centered in the space between contact 154, 155. The contact arm 153 is positioned jointly with the potentiometer slider 91 through a suitable operating means extending from member 95 on applying force to stick 14. A conductor 156 extends from the operable arm 153 to a suitable D. C. supply such as battery 157 having its opposite terminal connected to ground. The function of the various contacts of the H relay will be considered elsewhere in the operation of the system.

The K relay is of the six pole type having an operating winding 160. The poles engage four normally closed contacts $n$, $p$, $s$ and $t$ and two normally open contacts $m$ and $r$. When the winding 160 is unenergized, the four poles engage their respective "out" contacts $n$, $p$, $s$ and $t$ and the remaining two poles are disengaged from their "in" contacts $m$ and $r$. The relay operating winding 160 has one end connected by conductor 161 to an operable arm in relay H normally engaged with contact $d$. The opposite end of winding 160 is connected through a conductor 162 to a sector switch 163 associated with the roll attitude device 106 or bank synchronizer 129. The switch 163 comprises a sector member 164 extending ±7.5° on opposite sides of its center. The sector is engaged by an operable arm 165 positioned from the roll attitude device 106 the arrangement being such that when the craft rolls 7.5° in either direction about its longitudinal axis, the arm 165 will be disengaged from the sector member 164. The switch arm 165 is electrically connected to ground. A holding circuit is also provided on this end of the winding 160 and comprises a normally closed single pole single throw manually operable disengage switch 167 which is connected to "in" contact $m$ of the K relay. A conductor 169 which coacts with the operable arm associated with contact $m$ is connected to ground.

The L relay Figure 1B comprises two operable arms which coact respectively with normally open or in contacts $v$ and $w$. The relay includes an operating winding 170. The operating winding 170 is arranged in a time delay network 171. The winding 170 is energized from a supply conductor 173 which may be the B plus supply for servo amplifier 16. A protective resistor 172 extends from the conductor 173 to the relay winding 170. The opposite end of the relay winding is connected to signal ground and this is necessary since the B+ supply from which this relay is energized is referenced to signal ground. The winding 170 is shunted by a normally closed contact S of the K relay. When the shunt circuit is opened by operation of the K relay, a time delay circuit which also shunts the relay winding 170 and which consists of a 300 ohm resistor 174 and 240 microfarad capacitor 175 in series is in effect and capacitor 175 must be substantially charged up before the winding 170 can be effectively energized to close contacts $v$ and $w$.

For the purpose of associating the relays with their functions, the H relay may be identified as the roll control stick steering relay, the K relay as the heading control relay, and the L relay as the heading engage relay.

The energization of the K relay, the operation of which serves to introduce heading stabilization, is dependent upon the proper operating connection of the servomotor 12 to the aircraft attitude controller. This connection in turn is dependent upon the operation of the aileron engage relay 15 Figure 1b. However, the energization of the engage relay 15 in turn is dependent upon a prior synchronizing or balancing of the network 18 to the existing attitude of the aircraft about its roll axis.

The source of synchronizing signals for network 18 is provided by a voltage dividing arrangement 180, Figure 1b. This arrangement consists of a 270 ohm resistor 181 and a 30 ohm resistor 182 connected end to end with a junction connected to a terminal 187. A 90 ohm resistor 186 extends from terminal 187 to a ground conductor 188. Extending from the free end of resistor 181 is a conductor 183 connected to engage relay out contact 40, and extending from the free end of resistor 182 is a conductor 184 connected to relay out contact 38. A 28 volt D. C. supply is connected to the amplifier relays 45, 46 and it will be seen that when relay 45 is energized, 28 volts is supplied to conductor 184 and thus to one end of resistor 182 whereas when relay 46 is energized 28 volts are supplied to conductor 183 and thus to one end of resistor 181. The ground conductor 188 of resistor 186 is fourteen volts below that of signal ground 68 of the D. C. supply 58 Figure 1a. Consequently, with conductor 183 energized junction 187 is 7 volts below that of signal ground whereas when conductor 184 is energized, junction 187 is 7 volts above that of signal ground 68. A common conductor 189 for the operable contactors of amplifier relays 45 and 46 is connected to aileron engage relay arm 36. Thus in the unenergized condition of engage relay 15, relay contact 43 is energized whenever relay 45 or 46 of the servo amplifier 16 operates. Extending from relay contact 43 is a conductor 190 connected to an operating winding 191 of an aileron trim relay 192. The opposite end of winding 191 is grounded. The relay 192 includes an operable arm 193 which engages an in contact 194. A conductor 195 connects terminal 187 of arrangement 180 and arm 193. Extending in electrical series relations from trim relay contact 194 are a 10 kilo-ohm resistor 200, a 1 megohm resistor 197, a 5 megohm resistor 198, to network summing conductor 76. The junction of the 5 megohm resistor 198 and the 1 megohm resistor 197 is connected to signal ground through a 2 microfarad capacitor 199.

The resistors 200, 197, and capacitor 199 constitute a quick charge arrangement to network 18 upon closing of trim relay arm 193. Upon the opening of relay arm 193, the capacitor 199 and 5 megohm resistor 198 constitute a slow discharge circuit to network 18. Thus within the normal range of unbalance of the control circuit 18 of the servoamplifier 16, upon closing of amplifier relay 45, for example, the charge on capacitor 199 and thus the voltage at terminal 196 supplied to conductor 76 of network 18 increases rather quickly with time. When the increasing voltage at terminal 196 balances network 18, the amplifier 16 no longer operates and the amplifier relay 45 is open. Due to the high resistance of resistor 198, the condensor 199 slowly discharges and its discharge time is high with respect to its chargeup time which occurs when the relay arm 193 is closed. The network 18 thus only slowly becomes unbalanced during the discharge period of condensor 199. However should the network 18 by the discharge of capacitor 199 again become unbalanced, while some charge remains on condenser 199, a less charging time of condensor 199 is now required than initially before network 18 becomes balanced and this is desirable since for small signals on amplifier 16 a relay may be closed intermittently. The arrangement of the resistors is such that the discharge time of capacitor 199 as stated is much greater than the charging time. As will be brought out below, the auto-pilot or servomotor 12 may be engaged effectively with the actuator 10 during this discharge time of capacitor 199.

Engagement of the servomotor 12 with the attitude controller 10 depends upon the energization of the aileron engage relay 15. The operating winding 32 of the relay 15 is energized through a circuit including a conductor 202 extending from one end thereof (the opposite end thereof being grounded) an "out" contact 203 of an anti-engage relay 210, a relay arm 204, conductor 205, conductor 206, battery 207, a manually operable single pole single throw 208 to ground. The anti-engage relay 210 includes an operating winding 209 for the arm 204. One end of operating winding 209 is connected to ground and the opposite end is connected through a conductor 211 to a center tap of a 5000 ohm resistor 212. The ends of resistor 212 are connected to conductors 183, 184. Thus with the manually operable switch 208 in closed position, and with one or the other of the relays 45, 46 of servo amplifier 16 operating, the circuit through the relay winding 209 is completed to disengage relay arm 204 from its "out" contact 203 thereby opening the circuit for the engage relay winding 32 preventing its operation. However, if the network 18 is balanced so that the autopilot comprising network 18 is synchronized to the existing attitude of the aircraft by a synchronizing signal derived from the resistor arrangement 180 neither amplifier relay 45 or 46 will be operating. Consequently the relay 210 will be in its out position with arm 204 engaging contact 203. Thus upon closing switch 208, the relay 15 will be energized whereby the subsequent output of the amplifier derived by closing of relays 45, 46 will be supplied to the servomotor 12 to energize either its clutch windings as in the Gille patent or the actual field windings of the servomotor as in the Lear patent.

A circuit from battery 207, comprising conductor 206, conductor 214, engage relay arm 35, relay "in" contact 41 extending to servomotor 12 serves to energize the brake windings of the servomotor as in Gille or a magnetic clutch for coupling the Lear servomotor to the attitude controller 10. A holding circuit for relay 15 is effected through a conductor 216 extending from energized relay "in" contact 41 to conductor 202 and to relay winding 32.

Extending from energized conductor 202 is a conductor 217 connected to contact *d* of the H relay. Thus upon energization of the aileron engage relay 15 and with the H relay unenergized, at which time the control column 14 is in its unoperated position, the heading control relay K may be energized. This energization additionally depends upon the roll attitude of the craft being within 7.5° from a level position and is thus conditioned upon contactor 165 of switch 163 engaging contact 164.

During the de-energization of the K relay, the output of the heading error signal generator 23 is utilized to null itself through a compass synchronizer. For this purpose, the rotor winding 120 is connected through a normally closed contact *t* of the K relay and through a conductor 220 to an A. C. discriminator amplifier 221. The output of amplifier 221 energizes an amplifier winding 223 of a capacitor type induction motor 222. This motor additionally includes a line winding 224. The rotor 225 of the motor operates through a gear train 226 to reposition the rotor winding 120 until no signal therefrom is effective on amplifier 221. This type of amplifier-motor combination of the compass synchronizer is well known in the art see for example amplifier 33 and motor 36, Figure 1 of Patent 2,659,554.

*Operation*

Before the servomotor 12 is engaged, the control stick 14 may be directly manually operated to control the attitude control member 10 for banking the aircraft as desired. In conjunction with the operation of the control stick 14 to position the ailerons, the rudder surface of the craft in accordance with the prior art devices will also be positioned so that the craft may be placed in a banked turn. During such manual control of the craft in heading and banked attitude, the output of the heading error signal generator 23 is applied through normally closed contact *t* of the K relay and conductor 220 to the amplifier 221 which operates the motor 222. The motor 222 repositions the synchro rotor winding 120 to a null position.

If the network 18 becomes unbalanced due to the banking of the craft, the servo amplifier 16 operates one or the other of its relays 45, 46 whereby a synchronizing signal is provided by resistor arrangement 180 causing the rebalance of network 18. With the network 18 balanced neither amplifier relay 45, 46 is operated consequently the antiengage relay 210 is in unoperated position. By closing switch 208, a circuit is completed through the contacts of relay 210 to winding 32 of the aileron engage relay 15 to effect operation of the relay. With relay 15 energized, a holding circuit is provided between battery energized conductor 214 and relay winding conductor 202 by relay arm 35, in contact 41, and conductor 216. Thus despite subsequent operation of either amplifier relay 45 or relay 46 no operation of the antiengage relay 210 will ensue. With the relay 15 energized the output of the amplifier 16 is applied to the servomotor 12. The servomotor at this time is engaged with its attitude controller 10, either by the energization of its clutch windings if the servomotor be like in Gille 2,425,733, or energization of a magnetic clutch between the servo output shaft and attitude controller 10, through energized conductor 214, relay arm 35, and in contact 41.

With engage relay conductor 202 energized, operating winding 160 of the heading control relay K is energized through conductor 202, conductor 217, normally closed contact *d* of the H relay, conductor 161, operating winding 160, conductor 162, roll attitude responsive sector switch 163 to ground. On energization of winding 160, a holding circuit for the winding is completed through manually operable disengage switch 167, contact *m* of the K relay, conductor 169 to ground. Consequently, with this holding circuit, after the heading control relay K is energized, the aircraft may change its roll attitude during automatic heading control without the relay being de-energized by operation of sector switch 163.

Heading stabilization is achieved at this time since the output of the rotor winding 120 of signal generator 23 is applied through conductor 121 to demodulator 122. The opening of the normally closed contact *t* of relay K prevents the signal from rotor 120 at this time from being applied to amplifier 221. The heading error signal from the demodulator 122 and as applied to amplifier input conductor 126 is supplied through in contact *r* of the K relay and out contact *c* of the H relay to the terminal 141 of the D. C. to A. C. convertor 142 whereby the D. C. signal from demodulator 122 is converted to A. C. for bank synchronizer amplifier 128. The amplifier 128 in response to the heading error signal operates the motor 129 which through the gear train 146 positions slider 113 of the bank synchronizer potentiometer 112. The signal from potentiometer 112 is supplied to the input conductor 126 of the bank synchronizer 25 through resistors 224 and 225. However, the heading engage relay L is energized at this time closing contact *v*. The signal from the bank synchronizer potentiometer 112 as applied to terminal 116 Figure 1A is reduced in magnitude due to the shunt to signal ground provided from the junction of the 2.2K resistor and 8.2K resistor said shunt to signal ground comprising contact *v* of the L relay and the 1.8 kilo-ohm resistor 226. Thereby, the commanded bank angle of the craft from the heading error signal generator 23 because of the shunting resistor 226 will be reduced in value from that which would otherwise occur without the shunting resistor 226. Thus the ordered magnitude of the angle of bank of the craft is limited or reduced while the craft is being stabilized on a selected heading.

To effect manually selected banked turns of the craft through the control network 18 to change craft heading, the pilot applies force to the control column 14 in the direction in which it is desired that the craft be banked. The application of force to the control column causes the contactor 153 to engage one or the other of spaced contacts 154, 155 whereby a circuit is completed from battery 157, conductor 156, switch 152, conductor 151, operating winding 150 of the H relay to ground and return to battery ground. On operation of the H relay, the circuit to the winding 160 of the K relay is interrupted at normally closed contact $d$ thereby the relay K moves to unoperated or normally unenergized position.

The signal from potentiometer 90 due to operation of the control column 14 is no longer bypassed at contact $a$ of H relay to signal ground, but with the contact now in disengaged condition, the control stick steering signal is applied to network 18. Network 18 controls the servo amplifier 16 and thereby servomotor 12 to position the attitude controller of the craft. A follow-up signal in network 18 is provided through the operation of slider 56.

Since the servomotor 12 is effectively engaged with its controller, the servomotor 12 unless energized serves to hold the attitude controller in its adjusted position. Thus upon application of a force to the control column 14 a resisting force is derived through the locked or braked servomotor 12 through the actuating means 13 connected to hub 96. Consequently, a signal proportional to the effort applied to control column 14 is derived from potentiometer 90. This signal from control stick steering potentiometer 90 causes the operation of ailerons to bank the craft. When the craft has attained a desired angle of bank which is always in excess of 7.5° in order to open switch 163, the control column is returned to unoperated position with the craft remaining banked as selected.

With a force on the control column, and the K relay consequently de-energized, the heading error signal from signal generator 23 in rotor winding 120 is applied through the closed contact $t$ of the K relay to amplifier 221 whereby the signal generator 23 is now nulled.

The L relay is shunted by the closed contact $s$ of the K relay Figure 1b so that the contact $v$ of the L relay is disengaged. In the bank synchronizer signal circuit, contact $r$ is open, contact $c$ is open, contact $f$ is closed and contact $n$ is closed. At this time, it will be noted that the roll attitude signal from potentiometer 103 and the bank synchronizer signal from potentiometer 112 are supplied through 10 and 10.4 kilo-ohms of resistance to terminal 116 and thence through a resistor 230 and contact $f$ to the D. C. to A. C. convertor 142. At this time, any signal in bank attitude potentiometer 103 due to roll attitudes of the craft is applied to the synchronizer 25 which operates through motor 129 and bank synchronizer potentiometer 112 to supply an equal but opposing signal to terminal 116.

During this bank synchronizing operation, and with contact $b$ disengaged the attitude control signal is not supplied to network 18. Thus the bank attitude of the craft is achieved by operation of the control column 14 in the same manner as that technique used during direct manual control of the aileron surfaces and the banked attitude continues until reverse force is applied to column 14. As previously indicated, the displacement of the aileron surfaces or the attitude controller may be utilized to operate the rudder surface of the aircraft as in the aforementioned Rusler application.

When the aircraft has changed heading a desired amount, the control column 14 may be operated in the opposite to remove the bank of the aircraft. When the control column 14 is thereafter relieved of force to open switch 152 and with the roll attitude of the aircraft decreased to within 7.5° of level position, it is an indication that the pilot wishes to return to heading stabilization. The vertical gyroscope 106 through closed contact $b$, network 18, amplifier 16, servo 12 returns the craft to level attitude. With the control stick 14 in its unoperated position thereby opening switch 152 relay winding 150 of the H relay is de-energized. However, with the craft within 7.5° of level attitude position about the roll axis, the switch 163 is engaged whereby energization of the K relay is effected.

Since the aircraft is returning to stabilized heading control by the heading error signal generator 23, the bank synchronizer potentiometer 112 must be zero to correspond to the zero condition of the signal generator 23 at the instant of the application of heading stabilization. With the opening of relay contact $f$, there is no appreciable roll attitude signal of potentiometer 103 applied to bank synchronizer 25. The bank synchronizer 25 thus is responsive to the signal from the bank synchronizing potentiometer 112 which causes the motor 129 to return slider 113 to its null or no signal position. To increase the damping effect from the velocity signal generator 134 at this time, a full voltage divider consisting of series connected resistors 230, 231 are placed across amplifier input conductor 139 and ground. Thus the velocity signal tends to prevent the motor 129 from displacing slider 113 of the bank synchronizer potentiometer 112 rapidly. A period of time determined by the time delay network 171 Figure 1B permits the higher damping effect on motor 129 from the velocity signal generator 134. The time is selected to permit centering of slider 113 of the bank synchronizer prior to applying heading stabilization.

With the K relay energized thereby opening contact $s$, and the capacitor 175 now being substantially charged, the relay L is operated which through the now closed contact $w$ bypasses the resistor 231 connected to the velocity signal generator 134 whereby a smaller portion of the velocity signal is applied to the bank synchronizer amplifier 128.

With the bank synchronizer slider 113 centered and as the result of the operation of relay L, the contact $v$ is engaged whereby the heading error signal derived from potentiometer 112 and applied to network 18 is reduced. Through the operation of the relay contact $v$ as stated, an automatic gain reduction of the signal from potentiometer 112 as applied to network 18 is effected.

It will now be apparent that by means of the above described apparatus that the flexibility of manual control is provided through the automatic pilot which makes it possible to execute maneuvers through the control column 14 utilizing similar techniques that are utilized when directly controlling the attitude of the craft from the control column 14. Moreover, the automatic control system includes novel means for synchronizing the control system to an existing position or rate of change of position of the aircraft before such automatic control or manual control of the craft through the control system from column 14 may be effected. Also alternative control of the system through a heading stabilizing device is provided wherein the magnitude of bank of the aircraft through the system is limited.

Since various changes may be made in the construction and arrangement of the components of the system without departing from the spirit and scope of the invention, the limits of the present invention will be had primarily from the subjoined claims.

What is claimed is:

1. Apparatus for selectively controlling a condition in accordance with a signal or permitting direct manual control of the condition, said apparatus comprising: condition responsive means for detecting variations of said condition and supplying a first variable signal; an amplifier connected to said responsive means and controlled by said signal and having a pair of relays alternatively operated in accordance with the polarity of said signal;

servo means responsive to alternatively operated relays in said amplifier for maintaining said condition; means for disconnecting said amplifier from said servo means; further means alternatively controlled by said relays in said amplifier for deriving a fixed magnitude signal alternatively of opposite polarity in accordance with the operation of one or the other relay; a charging circuit connected to said further means having an output signal increasing for a finite period; and means for supplying said increasing signal to said amplifier in opposition to said first variable signal to balance said amplifier prior to servo means control.

2. Apparatus for selectively controlling the attitude of an aircraft in accordance with a signal or permitting direct manual control of the craft attitude, said apparatus comprising: attitude responsive means for detecting variations of said attitude and supplying a first signal variable in phase in accordance with the change in said attitude; an amplifier connected to said responsive means and including two relays operated alternatively in accordance with the phase of said signal; servo means responsive to said amplifier relays for maintaining said attitude; means for disconnecting said amplifier from said servo means; further means alternatively controlled by said relays in the amplifier for deriving a fixed magnitude signal alternatively of opposite polarity in accordance with the operation of one or the other relay; a quick charge-slow discharge circuit connected to said further means and having an output signal increasing for a finite period; means for supplying said increasing signal to said amplifier in opposition to said first variable signal, whereby said discharge circuit tends to maintain the amplifier in a condition where neither relay is operated.

3. Apparatus for selectively controlling a condition in accordance with a signal, said apparatus comprising: condition responsive means for detecting the variations of said condition and supplying a first variable phase signal; an amplifier connected to said responsive means and having circuits alternatively energized in accordance with the phase of said signal; servo means responsive to said amplifier for maintaining said condition; means for disconnecting said amplifier from said servo means; further means alternatively controlled by said circuits and said amplifier for deriving a fixed magnitude signal alternatively of opposite polarity in accordance with the operation of one or the other relay; a signal storage device connected to said further means and having an output signal increasing for a finite period; and means for supplying said increasing signal to said amplifier in opposition to said first variable signal.

4. Apparatus for controlling a motor means adapted to control a condition, said apparatus comprising: control means selectively connectable to and disconnectable from said motor means; a balanceable control network adapted on unbalance to operate said control means; an operation initiating element in said network; further means in said network for opposing the effect of said operation initiating element; means responsive to said control means for operating said further means, said further means comprising means for deriving a fixed magnitude signal alternatively of opposite polarity, a charging circuit comprising a storage device connected in said further means for supplying an output signal increasing for a finite period not exceeding the fixed magnitude wherein said further means is so connected as to supply an effect opposing that of the initiating element to synchronize said control means to said condition prior to control by said motor means.

5. An automatic condition control apparatus having servo means for controlling said condition, in combination: control means including alternatively energized circuits selectively connectable to or disconnectable from said servo means; a balanceable control signal providing system connected to said control means and adapted on an unbalance to operate in accordance with the direction of unbalance one or the other of the circuits of said control means; signal providing means unbalancing said signal providing system; further means in said system connectable to said circuits and controlled thereby for rebalancing said system, said further means comprising a source of fixed signal alternatively selectively of opposite positive or negative values connected to said circuits and responsive thereto, a storage device connected to said source and supplying an output increasing with time up to the magnitude of the fixed signal and means for supplying said output in opposition to the effect of said signal providing means in said signal providing system; and additional means to alternatively connect said circuits to said servo means.

6. In an automatic pilot for an aircraft having servo means for controlling craft attitude about a control axis, in combination: stabilizing means providing a signal for actuating said servo means so as to stabilize said aircraft about said control axis, synchronizing means associated with said stabilizing means for providing a signal adjusting the stabilized attitude of said aircraft to the instant attitude of said aircraft about said control axis prior to engagement of said stabilizing means and servo means; and means comprising a charging circuit rendered effective upon unbalance of said stabilizing means signal and engagement of said synchronizing means to said stabilizing means and disengagement of the stabilizing means and servo means for gradually increasing the signal from said synchronizing means for balancing the signal in the stabilizing means.

7. In an automatic pilot for an aircraft having servo means for controlling craft position by causing movement about a control axis thereof, in combination: a balanceable voltage network; stabilizing means having an output signal device connected to said network and having its output connectable thereby with said servo means to stabilize said aircraft; a synchronizing means including a fixed resistor arrangement providing a source of fixed voltage and voltage storing means having a time function connected thereto for providing a gradual increasing voltage alternatively connectable to said output device of the stabilizing means for adjusting the stabilized attitude to the instant attitude of the craft prior to engagement of said stabilizing means and servo means; and means for preventing connection of said stabilizing means to said servo means until said network has been placed in balanced condition by operation of said synchronizing means.

8. In an automatic pilot for an aircraft having servo means for controlling craft position about a control axis thereof, in combination: a balanceable voltage bridge network; stabilizing means connected thereto; selective means connecting said network with said servo means to stabilize said aircraft in a given position; voltage providing synchronizing means alternatively to said servo means connectable to said network for adjusting the stabilized attitude to the instant attitude of the craft prior to engagement of said stabilizing means and servo means, said synchronizing means including a source of fixed magnitude voltage derived from the operation of said stabilizing means and resistor-capacitor means connected between said source and said network for supplying a voltage varying at a selected increase adjustable rate not exceeding the fixed voltage.

9. Apparatus for controlling the attitude of an aircraft, comprising: first means producing a voltage varying in accordance with the attitude of said craft; manually operated means for producing an attitude control voltage; a servo mechanism responsive to said first voltage for stabilizing the attitude of the craft; operable further means responsive to said manually operable means disabling said first means to control said servo mechanism and enabling control thereof by said manually operated means; a second servo mechanism providing a synchronizing signal opposing said first signal and controlled by said first signal means during operation of said further means, said second servo mechanism including a velocity signal generator providing a velocity signal for damping movements of the second servo mechanism; and means effective on return of the manually operated means to unoperated position to increase temporarily the damping effect of said velocity signal on said second servo mechanism.

10. Apparatus for controlling the roll attitude of an aircraft, comprising: roll attitude responsive means producing a first voltage signal varying in magnitude in accordance with the roll attitude of said craft; manually operable means for producing a roll attitude control voltage; a servo mechanism responsive to said first voltage for stabilizing the roll attitude of the craft; operable further means responsive to displacement of said manually operable means disabling said first responsive means to control said servo mechanism and enabling control of said servo mechanism by said manually operated means; a second servo mechanism providing a synchronizing signal opposing said first signal and controlled by said first responsive means during operation of said further means, said second servo mechanism including a velocity signal generator providing a velocity signal for damping movements of the second servo mechanism; and means connected with the velocity signal generator and effective on return of the manually operable means and further means to unoperated position when the first responsive means again controls the first servo mechanism to increase the damping effect of said velocity signal on said second servo mechanism.

11. Apparatus for controlling the roll attitude and heading of an aircraft, comprising: first means producing a voltage varying in accordance with bank attitude of said craft; second means producing a voltage varying in accordance with change in heading of said craft; manually operated means for producing a control voltage; a servo mechanism responsive to said voltages from said first and second means for stabilizing the attitude and heading of the craft; operable further means responsive to said manually operable means disabling said first and second means to control said servo mechanism and enabling control thereof by said manually operable means; a second servo mechanism controlled by said first signal means and providing a synchronizing signal opposing said first signal during operation of said further means; means for nulling said second signal means during operation of said further means; a velocity responsive device included in said second servo mechanism and providing a damping effect depending on the velocity of movements of the second servo mechanism; and means effective on return of the manually operated means to an operated position to increase the damping effect of said velocity responsive device on said second servo mechanism.

12. Apparatus for controlling the heading of a craft by operation of the ailerons thereof comprising: first means producing a voltage varying in accordance with the heading error of said craft; manually operable means for producing a selected heading change voltage; third means for producing a voltage varying in accordance with the bank attitude of said craft; a first servo mechanism responsive to said first voltage for supplying a heading stabilizing voltage; a second servo mechanism responsive to said stabilizing voltage and to said attitude voltage for stabilizing the heading of the craft; and means controlled by said manually operable means for disabling said first voltage from controlling said first servo mechanism and disabling said attitude voltage from controlling said second servo mechanism but controlling said first servo mechanism from said attitude voltage; synchronizing means in said first servo mechanism operated thereby for providing a signal balancing said attitude voltage during operation of said manual means; and means effective on return of said manually operable means to unoperated positions for rendering said attitude means ineffective on said first servo mechanism and rendering said first signal providing means effective on said first servo mechanism; and additional means connected to said synchronizing means for reducing the effect of the heading signal on said second servo mechanism.

13. Apparatus for operating roll attitude controlling devices of an aircraft during heading control of the craft, said apparatus comprising: servo means operating said roll attitude controlling devices; an amplifier connected thereto for reversibly operating the servo means; a balanceable network controlling operation of the amplifier; a roll attitude signal generator; a heading error signal generator; a signal repeater servo mechanism comprising, a rebalancing signal generator, a motor controlled velocity responsive damping device, an amplifier-motor; means for controlling said repeater servo mechanism from said heading error signal, said rebalancing signal, and said velocity responsive device; further means for reducing or limiting the magnitude of the rebalancing signal; and additional means for supplying the reduced signal and the roll attitude signal in opposition to said balanceable network.

14. The apparatus of claim 13; including a manually operable signal generator displaceable from a normal position; means responsive to operation of the manually operable signal geneator from unoperated or normal position for rendering said heading signal generator ineffective on said repeater servo mechanism and rendering said roll attitude signal generator effective on the repeater servo mechanism while rendering the roll attitude signal generator ineffective on said network.

15. The apparatus of claim 14, and comprising time delay means responsive to return of said manually operable means to unoperated position for effecting operation of the means reducing the magnitude of the rebalancing signal to said network.

16. The apparatus of claim 15; comprising means effective on return of said manually operable means to normal position for, returning control of said repeater mechanism to said heading error generator, returning control of said network to said roll attitude generator, and increasing the damping effectiveness of said velocity responsive device on said repeater servo mechanism.

17. The apparatus of claim 16; and comprising time delay means responsive to return of said manually operable means to normal position for effecting operation of the means reducing the magnitude of the rebalancing signal supplied to said network.

18. Apparatus for controlling ailerons of an aircraft during heading control of the craft, said apparatus comprising; servo motor means operating said ailerons; a balanceable network controlling operation of the servo motor means; a roll attitude signal generator; a heading error signal generator; a repeater servo mechanism comprising, a rebalancing signal generator, a velocity signal generator, and motor means; operable means for controlling said servo mechanism from said heading error signal, said rebalancing signal, and said velocity signal; further means for controlling said network from said rebalancing signal and from said roll attitude signal; and additional means for reducing the magnitude of the rebalancing signal supplied to said network.

19. The apparatus of claim 18; and a manually operable signal generator displaceable from a normal position; control means responsive to operation of the manually operable signal generator from normal position for rendering said heading signal generator ineffective on said servo mechanism and rendering said roll attitude signal generator effective on the servo mechanism while rendering the roll attitude signal generator ineffective on said network; and switching means effective on return of said manually operable means to normal position for, returning control of said repeater servo mechanism to said heading error generator, control of said network to said roll attitude generator, and increasing the effectiveness of said velocity signal on said repeater motor means.

20. The apparatus of claim 19; and time delay means responsive to return of said manually operable means to normal position for effecting operation of the means reducing the magnitude of the rebalancing signal supplied to said network to limit the magnitude of the angle of bank derived from the operation of the servo mechanism.

21. The apparatus of claim 20, with means for nulling the heading error signal during displacement of the manually operable means from normal position to condition the heading signal generator for the resumption of heading control upon return of the manually operable means to normal position.

References Cited in the file of this patent

UNITED STATES PATENTS

| | | |
|---|---|---|
| 2,664,530 | Young | Dec. 29, 1953 |
| 2,740,082 | Sedgfield | Mar. 27, 1956 |